United States Patent [19]

McFarland

[11] 4,335,076
[45] Jun. 15, 1982

[54] CONVERTER FOR CONVERTING SULFUR DIOXIDE TO SULFUR TRIOXIDE

[75] Inventor: John McFarland, Campbellville, Canada

[73] Assignee: Chemetics International Ltd., Montreal, Canada

[21] Appl. No.: 224,154

[22] Filed: Jan. 12, 1981

[30] Foreign Application Priority Data

Sep. 19, 1980 [CA] Canada .................................. 360774

[51] Int. Cl.³ ............................................ B01D 50/00
[52] U.S. Cl. .................................... 422/171; 422/173; 422/181; 422/192; 422/198; 422/207; 422/239; 423/533
[58] Field of Search ............... 422/171, 173, 176, 177, 422/181, 191, 192, 193, 194, 195, 198, 207, 239, 240; 423/532, 533

[56] References Cited

U.S. PATENT DOCUMENTS

| | | | |
|---|---|---|---|
| 3,475,136 | 10/1969 | Eschenbrenner et al. | 422/207 X |
| 3,506,408 | 4/1970 | Kageyama et al. | 422/191 |
| 3,746,515 | 7/1973 | Friedman | 422/191 |
| 3,933,434 | 1/1976 | Matovich | 422/240 |
| 4,205,044 | 5/1980 | Gramatica | 422/191 |

Primary Examiner—Richard L. Chiesa
Attorney, Agent, or Firm—Bernard F. Roussin

[57] ABSTRACT

A converter for converting $SO_2$ to $SO_3$, having an exterior shell, a central axial core tube, and a number of annular catalyst beds one above the other, placed on support plates and separated by division plates. The shell, core tube, support and division plates are all of stainless steel. The support and division plates are performed in a domed shape to prevent excessive sagging in use and are welded to the shell and core tubes, except for the support plate of the first bed. The first bed is at the bottom of the converter and its support plate is welded to an encircling plenum through which supply gas enters. The plenum shields the shell from the hot first bed and produces abrupt changes in the flow direction of the supply gas to remove entrained particles therefrom. From the first bed the gas flows through an internal axial heat exchanger in the core tube, where the gas is cooled against gas from the intermediate absorber, eliminating the need to remove the very hot first bed gas from the converter with a bellows piping system. The first bed gas enters a second bed at the top of the converter and then leaves the converter via a large diameter exit opening in the shell, which opening is of larger diameter than the height between the second bed support plate and its adjacent division plate. The height difference is accommodated by a slot cut in the division plate and a transition plate welded between the slot and the lower part of the exit opening.

26 Claims, 7 Drawing Figures

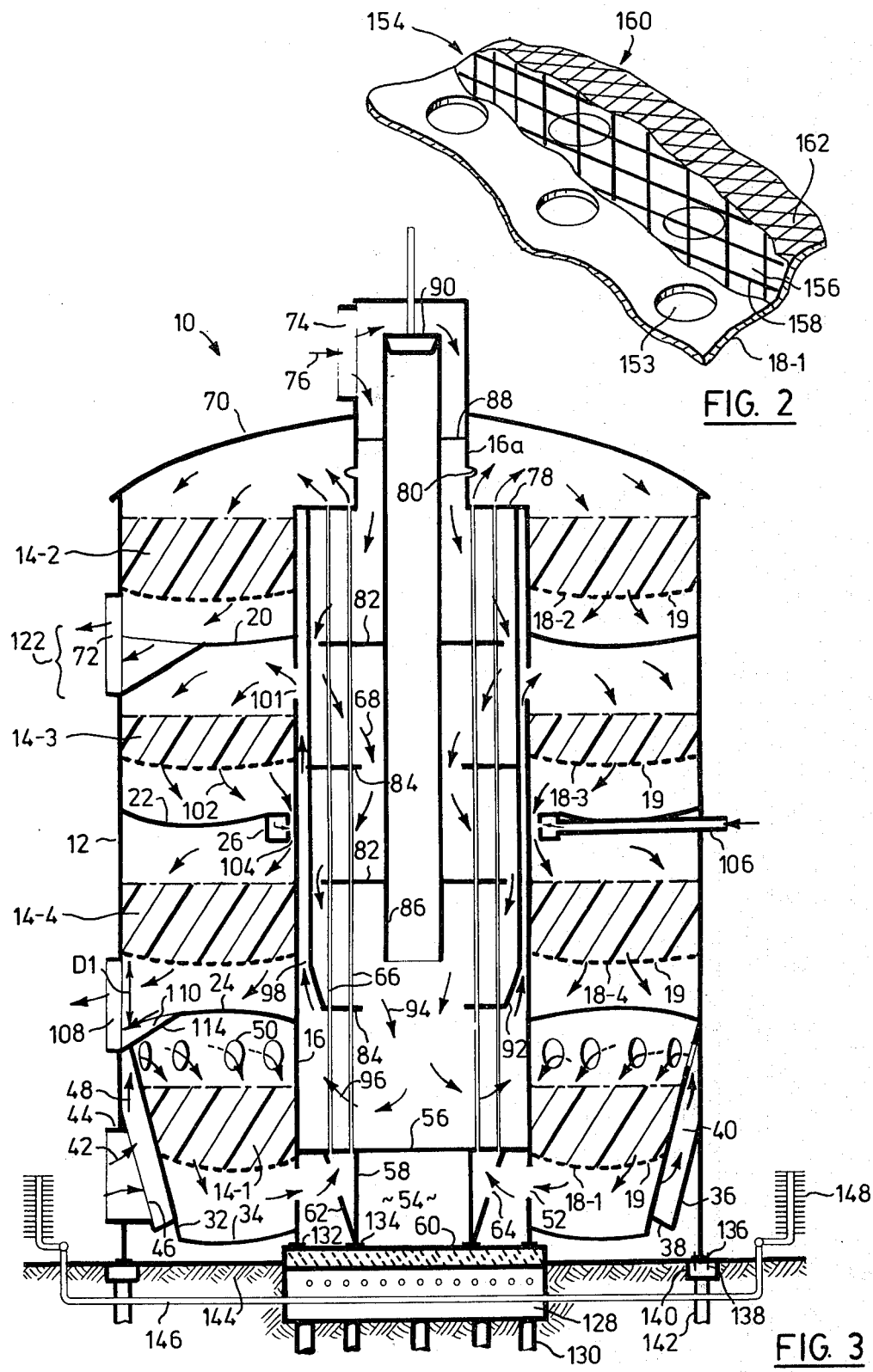

CONVERTER FOR CONVERTING SULFUR DIOXIDE TO SULFUR TRIOXIDE

This invention relates to converters of the kind used to convert sulphur dioxide gas to sulphur trioxide gas. Such converters are usually used in the manufacture of sulphuric acid.

Converters presently used to convert sulphur dioxide gas to sulphur trioxide gas are normally large cylindrical vessels containing a number of granular catalyst beds. Each catalyst bed occupies the complete cross-section of the vessel and the beds are disposed one above the other. The process gas passes through the catalyst beds in sequence and is cooled between beds both to recover the heat generated in each bed and to assist in the kinetics and equilibrium of the reaction. Each bed is separated from the others by a division plate.

The converters used in the industry suffer from a number of serious disadvantages. Among these disadvantages are the following.

The outer shell of the converter is normally fabricated from carbon steel, typically sprayed with aluminum to resist high temperature oxidation. Because the highest temperatures are generated in the first catalyst bed, it is necessary to place the first catalyst bed at the top of the converter tower. When the first bed is so located, the very hot shell around the first bed is not required to support any load above the first bed and therefore is less likely to rupture. Since the metal of the shell around the first bed is heated to a temperature at which it is weakened and frequently bulges, location of the first bed at the top of the converter has important structural benefits. However most of the dirt in the gas entering the converter is caught by the first catalyst bed, since the catalyst is sticky and tends to remove dirt. Since dirt accumulation will block a bed, the first catalyst bed must be cleaned more often than the others. Locating the first bed at the top of the converter, usually many feet in the air, requires scaffolding for the clean-out process and renders the clean-out difficult.

In addition, should the first bed collapse due to the high temperatures within it, a circumstance which occasionally occurs, the contents of the first bed will be dropped onto the bed beneath it, tending to cause a series of collapses within the converter tower. It would therefore be preferable, if possible, to place the first bed at the bottom of the converter.

A further disadvantage of present converter design is that the beds themselves are often supported on a series of cast-iron plates, generally of equilateral triangular form, supported from the base of the converter by numerous cast-iron pillars. Subsequent beds and division plates are supported from the level beneath them. The forest of cast-iron plates and pillars results in extremely high erection costs and complicates maintenance and clean-out of the beds.

In addition, because cast-iron division plates cannot be welded, they are normally sealed to the shell by packing asbestos rope between the division plates and the shell and also between the division plates themselves. Since sulphur dioxide rich gases in the converter are generally at a higher pressure than sulphur dioxide lean gases, leakage of sulphur dioxide rich gases tended to occur past the converter beds, reducing the conversion efficiency and increasing pollution.

As an alternative to the pillar and triangular plate structure, some converters have been fabricated employing cast-iron or mild steel plates supported on beams between a central core tube and the outer shell. Where cast-iron has been used, the previously described leakage problems have occurred. If steel division plates are used, they can be welded, but because they sag in use, the welds break. They can then be rewelded and usually will not break again, having formed themselves, but this requires costly extra welding and involves considerable down time for the converter.

Another factor involved in converter design is that, since catalyst must be loaded and unloaded from the beds, and gas must be introduced above and removed below the beds, spaces must be allowed above and below each bed. The height of such spaces is generally governed in practice by the need to allow free movement of people inside the spaces (to load and unload catalyst and for maintenance purposes). Such height is frequently less than the diameter of the gas inlet and exit ducts used. Therefore, such ducts are often modified into an eliptical or rectangular form for entry into the converter, a costly arrangement. Even with this arrangement, considerable difficulty is encountered in obtaining good gas distribution within the converter. The high local gas velocities which commonly occur can disturb the catalyst bed physically, resulting in poor performance, requiring that the catalyst be covered with a top layer of protective stones. The stones add undesirable weight and interfere with cleaning the catalyst.

A further disadvantage of converters commonly used is that they are supported on I-beams and are permitted to move back and forth across the beams in order to accomodate their expansion. Because of this the exact radial position of the converter has an uncertainty of several inches. This creates severe stresses in the piping connected to the converter.

A still further disadvantage of converters now used is that the gas exiting from the first catalyst bed is at a very high temperature (typically over 600° C.), so that the exit pipe from the first bed requires a bellows therein. The bellows causes maintenance difficulties and in addition occupies a great deal of space, so that a 30 foot diameter converter may require a 50 foot diameter space to cope with its attendant input and exit piping.

The present invention involves a number of aspects, each of which deals with one or more of the above identified disadvantages. In one aspect the invention provides a converter having an exterior shell of stainless steel, an interior core tube of stainless steel extending vertically within said shell and being concentric thereunder, a plurality of annular catalyst beds within said shell and located one above the other, means supporting said beds from said shell and from said core tube, means for conducting sulphur dioxide gas from a source of such gas into the lowermost of said beds so that said lowermost bed is the first catalyst bed, and means for conducting gas from said lowermost bed in succession through the remaining catalyst beds.

In another aspect the invention provides a converter having:

(a) an exterior shell,
(b) a plurality of vertically spaced catalyst beds within said shell, one of said catalyst beds being a first catalyst bed to receive sulphur dioxide containing gas from a source of said gas,
(c) means defining a plenum around said first bed, (d) means defining with said plenum a space above said first bed, (e) said plenum having a gas inlet opening therein for receiving said gas, and a circumferential outlet opening into said space, said outlet opening being located above said inlet opening and said plenum and said inlet and outlet openings being arranged for gas entering said inlet opening to change its direction sharply to pass through said plenum toward said outlet opening and then again to change direction sharply to pass through said outlet opening, whereby to tend to remove particulates entrained in the gas entering said inlet opening.

In another aspect the invention provides a converter having:

(a) a shell, (b) an interior core tube extending vertically within said shell and being concentric therewith, (c) a plurality of annular catalyst beds within said shell and located one below the other, a plurality of support plates one supporting each of said beds from said shell and from said core tube, (e) axial heat exchange means within said core tube for conducting hot gas axially from one of said beds of a second of said beds, (f) said heat exchange means including means for conducting cooled gas past said hot gas to cool said hot gas and to warm said cooled gas, and for directing such warmed cool gas into a third one of said beds, (g) a plurality of division plates one between each adjacent pair of said beds and separating said beds, (h) said support plates and division plates being preformed in essentially the configuration of a trough-shaped toroidal section encircling said core tube, to reduce sagging of said support plates and division plates in use.

In another aspect the invention provides a converter having an exterior shell, at least two catalyst beds within said shell, one above the other, each catalyst bed having a support plate for said catalyst thereof, a division plate between said beds, said support and division plates extending to and being sealingly secured to said shell, said division plate and said support plate of said one bed defining a space therebetween, said shell having an opening therein below said support plate of said one bed for flow of gas between said space and the exterior of said converter, the diameter of said opening being greater than the height of said space, said division plate having a slot therein, the periphery of said slot meeting the edges of said opening, and a transition plate extending between the periphery of said slot and the periphery of that part of said opening located below said transition plate.

Further objects and advantages of the invention will appear from the following description, taken together with the accompanying drawings in which:

FIG. 2 is a perspective view of a portion of the catalyst support structure of the FIG. 1 converter;

FIG. 3 is a view in vertical section of the converter of FIG. 1;

Figure 1:
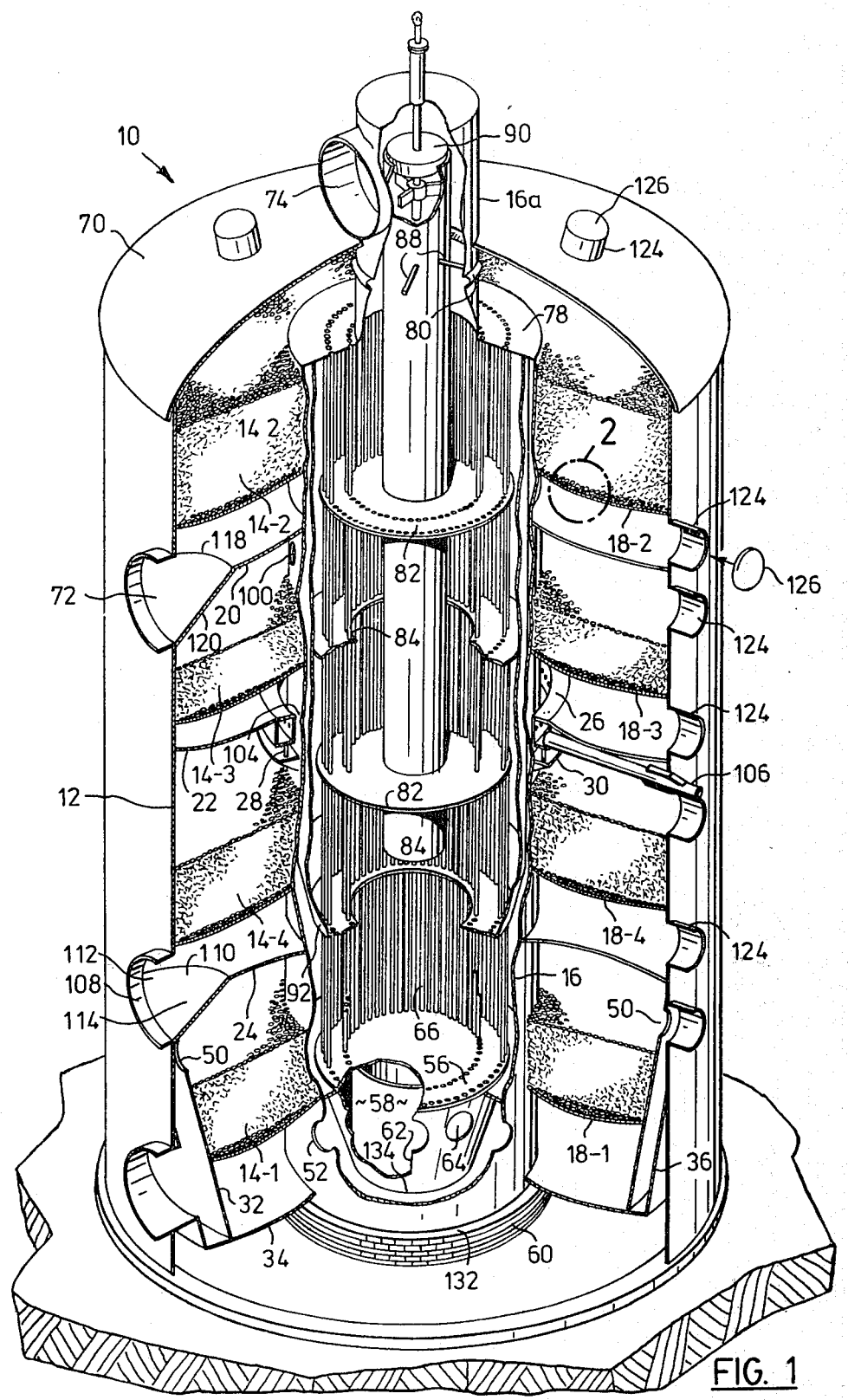
FIG. 1 is a perspective view, partly cut away, of a converter according to the present invention.

Reference is first made to FIGS. 1 and 3, which show a converter generally identified at 10 and havisng a shell 12. The shell 12 may typically be 30 to 40 feet in diameter, and 40 to 50 feet in height, and is made of a tough material which maintains substantial strength at the maximum temperatures occurring in the converter (about 600° C.). Stainless steel is preferred, but other suitable materials may also be used, such as titanium or titanium alloys. Where stainless steel is used in a tower of the dimensions mentioned, the thickness of the stainless steel may typically be between 3/16 and ¼ inch. It is found that with the design to be described, a stainless steel shell even of this small thickness will not bulge, although it is common for a one inch thick carbon steel shell to bulge severely. In the description of the preferred embodiment, the use of stainless steel will be described.

Located within the shell 12 are four catalyst beds 14-1, 14-2, 14-3, and 14-4, through each of which the process gas is passed. Each catalyst bed 14-1, to 14-4 is annular in form, being located between the outer shell 12 and an inner core tube 16 formed from stainless steel.

Each catalyst bed 14-1, to 14-4 is supported on a stainless steel annular support plate 18-1 to 18-4 respectively. The support plates 18-1 to 18-4 have holes 19 therein (also shown in FIG. 2) to permit gas to pass therethrough and are preformed into a concave configuration as viewed from above (to be described in more detail presently), to prevent excessive sagging when they are loaded and subjected to heat. The support plates 18-1 to 18-4 are welded around their inner peripheries to the inner core tube 16 and (except for plate 18-1) are welded around their outer peripheries to the outer shell 12.

The catalyst beds are separated by division plates 20, 22, 24, also of stainless steel. The upper two division plates 20, 22 are also preformed into a concave shape as viewed from above to eliminate excessive later sagging. The shape will be seen to be that of a trough-shaped toroidal section. The upper division plate 20 is welded at its outer and inner peripheries to the shell 12 and the core tube 16 respectively. The middle division plate 22 is welded around its outer periphery to the outer shell 12 and is welded at its inner periphery to a cold gas distributing duct 26 (to be described) supported by spaced posts 28 (FIG. 1) on a radially outwardly projecting ring 30 welded from the core tube 16.

The division plate 24 between beds 14-1 and 14-4 is also welded around its outer and inner peripheries to the shell 12 and core tube 16 respectively but is domed upwardly instead of downwardly. The upward doming also prevents excessive sagging in use.

The side of the first bed 14-1 is bounded by a stainless steel side plate 32, which slopes downwardly and inwardly from the division plate 24 in the shape of an inverted truncated cone. The first bed support plate 18-1 is welded around its outer periphery to the side plate 32. A downwardly domed bottom plate 34 is welded around its outer and inner peripheries to the bottom of the side plate 32 and to the core tube 16 respectively. Encircling the lower portion of the side plate 32 is a second side plate 36, also defining an inverted truncated cone. The upper periphery of the second side plate 36 is welded to the shell 12. The lower periphery of plate 36 is welded to an upwardly and inwardly sloping annular connecting plate 38 which is in turn welded to side plate 32. The shell 12, side plates 32 and 36, and connecting plate 38 together form an annular chamber 40 which encircles the first bed 14-1.

Gas 42 containing sulphur dioxide to be converted enters the first bed 14-1 via a large duct 44 which passes through the outer shell 12 and opens at 46 into the annular chamber 40. The inlet gas flows around the chamber 40 and turns upwardly, as indicated by the arrows 48, and then flows radially inwardly through circumferentially spaced holes 50 located in side plate 32 above the first bed 14-1. The gas then passes downwardly through the first bed 14-1, sweeps beneath the first bed, and then flows into the core tube 16 via circumferentially spaced holes 52 in the core tube.

The lower portion of the core tube 16 contains a plenum 54 defined by a circulr flat tube sheet 56 and a vertical annular support plate 58 which extends between a central base portion 60 and the tube sheet 56. A second annular support plate 62 in the shape of an inverted truncated cone extends between the base portion 60 and tube sheet 56 to help support the tube sheet. The plate 62 contains a row of circumferentially spaced holes 64 for gas to pass therethrough.

Gas from the plenum 54 travels upwardly through a series of heat exchanger tubes 66 (of which there are a number of rings, only two rings being shown) to the top of the converter tower. During its passage through the tubes 66, the gas in tubes 66 is cooled by counter-current flowing gas indicated by arrows 68, as will be described. The cooled gas leaving the heat exchanger tubes 66 fans out under the dome-shaped converter roof 70 and enters the second converter bed 14-2. After passing through bed 14-2, where additional conversion occurs, the gas leaves the converter via exit opening 72 in the outer shell 12.

In a conventional application of the converter, the gas leaving via exit opening 72 is cooled and then directed to an intermediate absorber (not shown) where sulphur trioxide is absorbed. The cooled gas from the intermediate absorber, still containing $SO_2$ to be converted, then re-enters the converter 10 via entry opening 74 at the top of the converter. The re-entering gas is indicated by arrows 76.

The cooled gas flowing through opening 74 passes downwardly through a reduced diameter upper portion 16a of the core tube 16. Portion 16a of the core tube is welded to an annular upper tube sheet 78 which in turn is welded at its periphery to the upper edge of the core tube 16. Tube sheet 78 retains the upper ends of the tubes 66. As shown, portion 16a of the core tube contains a bellows 80 to accommodate the differential expansion of the hot roof 70 of the shell 12 and the cooler upper portion 16a.

After the gas leaves the reduced diameter portion 16a of the core tube, it is directed by disc and donut baffles 82, 84 respectively, past the heat exchange tubes 66, to rewarm the cooled gas from the intermediate absorber and to cool the gas passing from the first bed 14-1 to the second bed 14-2. The disc baffles 82 are fastened to an internal axial by-pass tube 86 which extends from just below the top of upper core tube portion 16a downwardly to approximately the level of the fourth bed 14-4. Struts 88 support the by-pass tube 86 at its top from the upper core tube portion 16a. A by-pass valve 90 is fitted within the top of the by-pass tube 86, to allow some cooled gas from the intermediate absorber to by-pass most of the length of the heat exchange tubes 66, to reduce the extent of cooling of the gas flowing from the first bed 14-1 to the second bed 14-2. The by-pass is provided because the heat exchanger is usually made oversize so that it will have sufficient capacity even when it becomes dirty after long use.

The donut baffles 84 are mounted on a heat exchanger shell 92 located within the core tube 16 and concentric therewith. The shell 92 is suspended from the upper tube sheet 78 and terminates at the bottom donut baffle 84, well above the bottom tube sheet 56.

After the gas indicated by arrows 94 has passed the last donut baffle 84, it flows upwardly as indicated by arrows 96, through the narrow annular space 98 between the shell 92 and the core tube 16. This gas then enters the space above the third bed 14-3, via a row of circumferentially spaced holes 100 in the core tube 16.

The process gas after passing through the third bed 14-3 then flows as indicated by arrows 102 into the space above the fourth bed 14-4, via a narrow gap 104 between the distributing duct 26 and the core tube 16. Only slight cooling is required after the gas passes through the third bed 14-3, and this cooling is typically provided by a cold air quench which is supplied from the distributing duct 26 via a conduit 106.

The gas after passisng through the fourth bed 14-4 finally leaves the converter via an exit opening 108 in the shell 12, and is then directed to the final absorber (not shown).

It will be seen that the diameter of exit opening 108 is greater than the height D1 of the space between the fourth bed support plate 18-4 and the division plate 24 beneath this support plate. This difference in size is accommodated by providing a curved slot 110 (FIG. 1) in the division plate 24 where the division plate 24 meets the borders of opening 108. The outer edges of the slot 110 meet the borders of the opening 108 at points 112 (only one point 112 is shown), and extend inwardly sufficiently so that the area of the slot 110 is preferably at least as great as the area of that part of exit opening 108 located below the division plate 24. A transition plate 114, of curved configuration, extends between the edges of the slot 112 and the periphery 116 of that part of exit opening 108 located below the division plate 24. The transition plate 114 allows smooth, relatively unrestricted flow of gas from the narrow space below the bed 14-4 into the exit opening 108.

As shown, the same structure is provided for exit opening 72 from bed 14-2, i.e. a slot 118 is formed in division plate 20, and a transition plate 120 extends between slot 118 and the portion 122 of the periphery of opening 72 located below the division plate 20.

Access openings to the spaces above and below the beds 14-1 to 14-4 are provided by cylindrical tubes 124 (FIG. 1) welded from and projecting from the exterior shell 12 and having closed ends 126. When access is needed to the interior of the converter, the ends of the projecting tubes 124 are simply cut off with a torch, to allow maintenance personnel to enter. After maintenance has been completed, the closures 126 are rewelded onto the tubes 124.

The central base portion 60 of the converter is formed of refractory concrete or fire brick, which in turn rests on a concrete footing 128 supported on piles 130. Horizontal stainless steel rings 132, 134 are welded to the bottoms of core tube 16 and support plate 58 respectively to form T-shaped fittings which support core tube 16 and support plate 58 on the central base portion 60. The rings 132, 134 are free to slide on the central base portion 60, to allow for expansion.

The outer shell 12 is separately supported on a stainless steel ring 136 welded to the bottom of the shell 12 and tied by bolts 138 to a separate concrete foundation 140. Foundation 140 is supported on piles 142. Because shell 12 is tied at its bottom to the foundation 140, the position of the bottom of the shell 12 is fixed and is always determined. The top part of the shell will expand radially outwardly in use, the bottom part acting as a hinge about which this expansion occurs.

The area between the foundation 140 and central base portion 60 is filled with crushed stone 144, which helps to insulate the hot lower portion of the converter from the ground below. Heat pipes 146, having finned heat sinks 148, extend through the gravel and through the footing 128 to remove excess heat to atmosphere.

The structure described has a number of significant advantages. Firstly, since the first catalyst bed 14-1 (which requires the most maintenance) is located at the bottom of the converter rather than at the top, the maintenance of this bed is greatly simplified.

Secondly, because the gas entering the first bed 14-1 is forced to make two abrupt changes in direction before it can pass through the holes 50, particles of dirt carried with the gas tend to drop into the bottom of the annular chamber 40, reducing the contamination of the first bed 14-1.

Thirdly, because the outer periphery of the first bed 14-1 is located against the side plate 32, rather than against the shell 12, less heat from the first bed 14-1 (which is the hottest of all the beds) is transferred to the outer shell 12, reducing heat related weakening of the outer shell. The hot gases below the first bed 14-1 are also prevented by the side plate 32 from contacting the load bearing shell 12. Heat losses are also reduced by this arrangement.

Fourthly, gas enters the first bed 14-1 from a plenum chamber 40 extending around the entire periphery of the first bed, so that the local velocity of gas entering the first bed is much lower than would be the case if the gas entered the first bed directly from a duct. Therefore, little or no protection of the top of the first catalyst bed by means of a layer of stones is required.

Fifthly, because the hot gases from the first bed 14-1 are directed upwardly to the second bed 14-2 via an interior axial heat exchanger, the usual complex bellows system used to conduct the hot gases from the first bed out of the converter has been eliminated. In addition, the upwardly moving gases from the first bed, after leaving heat exchanger tubes 66, impinge on and fan out under the domed roof 70 of the converter, thereby also reducing the local velocity of the gas entering the second bed 14-2. Thus the catalyst in bed 14-2 is also less likely to be physically disturbed by the gas and requires little or no protection by a layer of stones.

Sixthly, the preformed division plates 20, 22, 24 and the bottom plate 34 allow a tight seal between stages of the converter while greatly reducing the likelihood of broken welds caused by sagging of the plates in use. This reduces the likelihood that $SO_2$ containing gas will by-pass beds of the converter.

Seventhly, the transition plates 114, 120, together with the slots 110, 118 in the division plates 24, 20, permit the use of large diameter exit ducts without the need for complex horn-shaped ducting between the exit ducts and the converter. This not only reduces the cost of the structure but also considerably reduces the plant space required, since the horn-shaped ducting occupies substantial space.

Figures 4, 5:
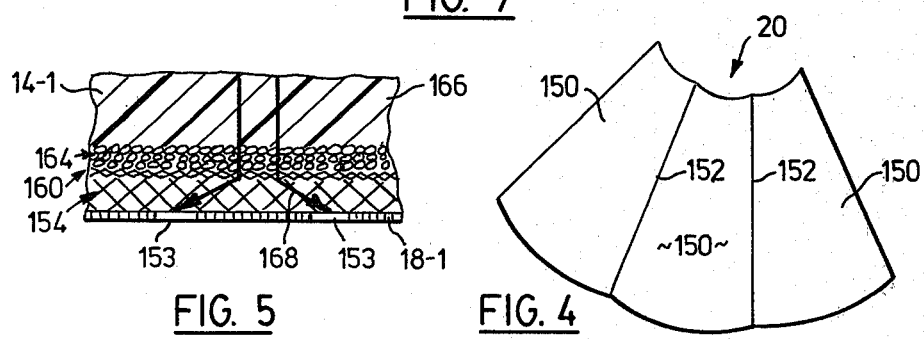
FIG. 4 is a perspective view of a portion of a catalyst support plate of the FIG. 1 converter.
FIG. 5 is a vertical sectional view of a portion of the catalyst support system of the FIG. 1 converter.

Although the division plates 20, 22, 24 and the bottom plate 34 ideally have a true double curvature form, i.e., the form of a surface of revolution (in other words the form of a trough-shaped toroidal section), this form is in fact difficult to fabricate in large sizes. Therefore if desired the plates 20, 22, 24, 34 may be made in single curvature form, i.e. as a series of segments like an umbrella, as shown in FIG. 4. In FIG. 4, the individual segments of a portion of division plate 20 are indicated at 150, each segment having the forms of a surface of revolution. The segments 150 are welded together along their edges 152 to form a downwardly domed umbrella-shaped division plate 20.

In use, and as the division plate 20 heats, the form shown in FIG. 4 will sag to approximately a true double curvature form, without creating strains which would rupture metal or break the welds either between the segments or between the segments and the shell and core tube.

The catalyst support system is shown in detail in FIGS. 2 and 5. As shown, the catalyst support plate 18-1 (which is typical of all the catalyst support plates) includes a number of holes 153 of considerable size, e.g. two inch diameter, spaced on six inch centres. The plate 18-1 supports a layer of stainless steel expanded metal 154. The expanded metal 154 is very coarse, and may typically be formed from stainless steel sheets of thickness about 0.14 inches. After forming into expanded metal, the sheet is of thickness about ⅜ inch, with diamonds 156 of dimension about three inches by one inch, and with ligaments 158 about 0.14 inches square.

The expanded metal 154 supports a second and less coarse layer of stainless steel expanded metal 160, typically formed from 18 gauge material, of ligament thickness about 0.1 inch square and with openings or diamonds 162 of size about 0.75 inch by 0.25 inch.

The upper layer of expanded metal 160 carries a layer of stones 164 which prevent the catalyst pieces 166 from contacting the stainless steel, since the catalyst tends to flux or melt into the openings of any metal which it contacts. If the mesh 160 is made of material with which the catalyst will not flux, then the stones 164 can be eliminated.

The coarse expanded metal mesh 154 is about 70% voidage; the fine expanded metal mesh 160 is about 60% voidage, the stones 164 are about 50% voidage, while the catalyst 14-1 is about 36% voidage for solid cylindrical pieces 166 of catalyst and slightly higher for tubular pieces of catalyst. The mesh 154 permits gases flowing through the catalyst 14-1 and stones 164 to flow with a minimum of back pressure as indicated by arrows 168 in FIG. 5, into the holes 153 in the support plate 18-1.

Figure 6:
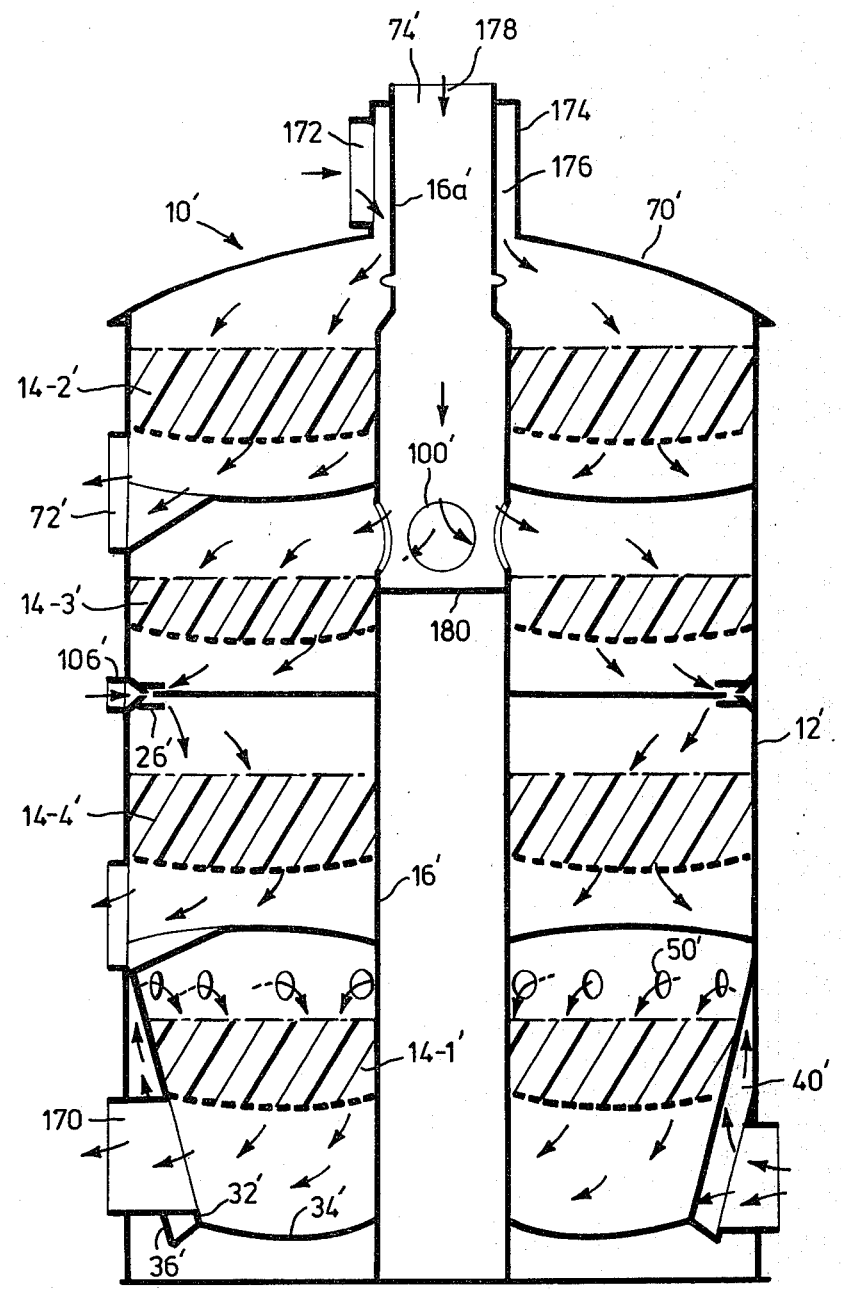
FIG. 6 is a view similar to that of FIG. 3 but showing a modification of the FIG. 1 converter.

Reference is next made to FIG. 6, which shows an embodiment similar to that of FIGS. 1 to 5, and where primed reference numerals indicate parts corresponding to those of FIGS. 1 to 5. The major difference in FIG. 6 embodiment is that there is no internal axial heat exchanger. Instead, gas from the first bed 14-1' leaves the space below the first bed support plate 18-1' via an exit duct 170, and is cooled outside the converter. The cooled gas is then brought back into the converter via a top opening 172 in an outer tube 174 encircling the upper core tube portion 16a'. Tube 174 is closed at its top to define an annular space 176 which opens downwardly into the space above the second bed 14-2'. The cooled gas entering opening 172 flows through the annular space 176 and then through the second bed 14-2. The gas then leaves the space below the second bed, via opening 72', and is directed to the intermediate absorber (not shown). The gas from the intermediate absorber is returned to the converter directly into the core tube upper portion 16a', as indicated by arrow 178. The gas flows into core tube 16' and is distributed through holes 100' into the space above bed 14-3. A barrier 180 in tube 16' prevents the gas from travelling much below the holes 100'.

In the FIG. 6 embodiment the distributing duct 26' is located at the wall of the outer shell 12', and the cold air quench is supplied directly via conduit 106' into the duct 26'.

Figure 7:
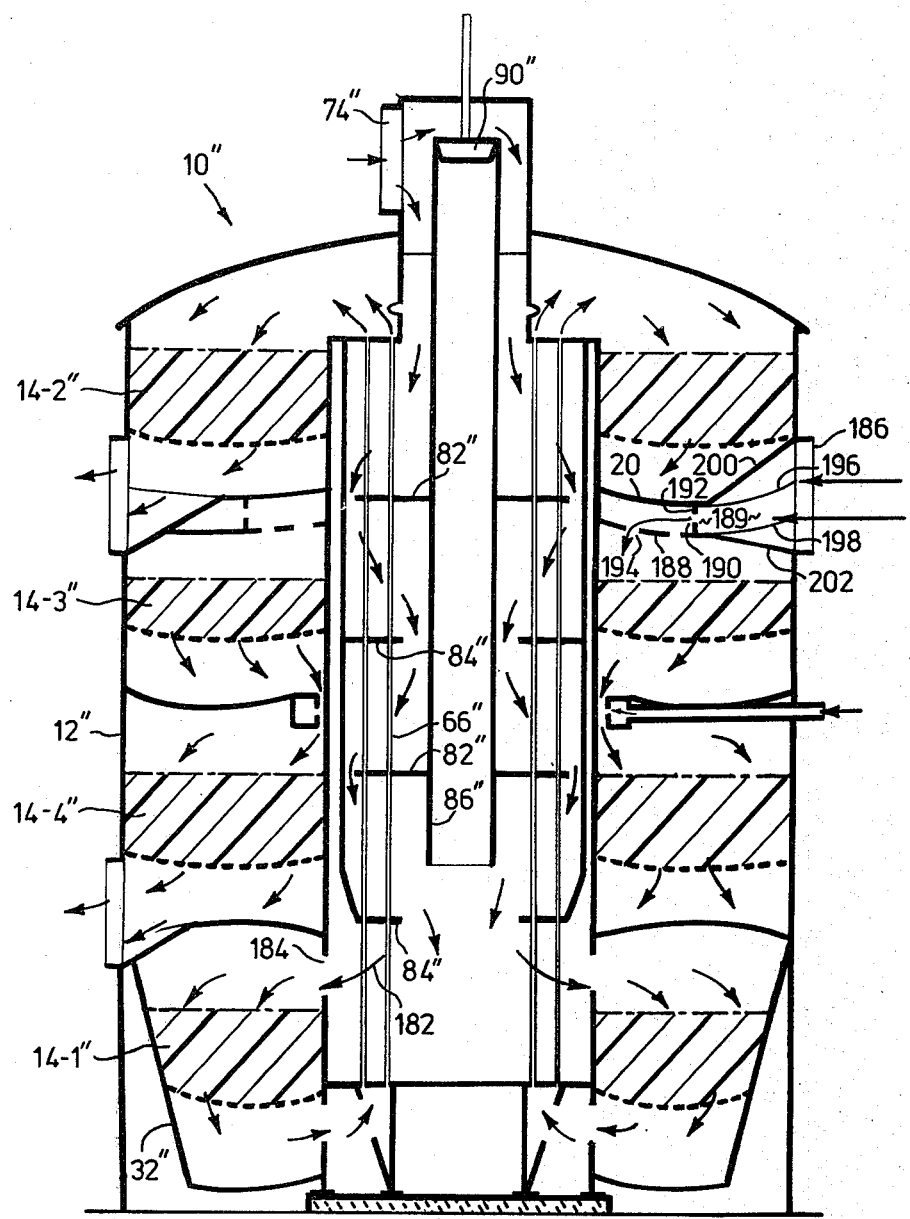
FIG. 7 is a view similar to that of FIG. 3 but showing a still further modification of the FIG. 1 converter.

Reference is next made to FIG. 7, where double primed reference numerals indicate parts corresponding to those of FIGS. 1 to 5. FIG. 7 shows a converter for use where the sulphur dioxide is obtained from a metallurgical plant rather than from a sulphur burning plant as was assumed to be the case in the previous embodiments. When the sulphur dioxide containing supply gas is obtained from a metallurgical plant, the gas will have been cleaned prior to entry into the converter and will be much cooler than the gas from a sulphur burning furnace. Therefore the supply gas now enters the converter at the upper opening 74" and then travels downwardly through the heat exchanger, where it cools the gas in tubes 66" from the first bed 14-1" and is in turn warmed prior to its entry into the first bed.

After the supply gas, indicated by arrows 182, has passed the last donut baffle 84", it enters the space above the first bed 14-1" via a series of circumferentially spaced holes 184 in the core tube 16". The plenum 54 has been eliminated but the side plate 32" still prevents the first bed and the hot gases beneath it from contacting the shell 12".

The remainder of the FIG. 7 system is the same as that of FIGS. 1 to 5, except that the gas from the intermediate absorber (not shown) now enters the third bed 14-3" via an inlet opening 186 in the side of the shell 16". To reduce local gas velocities, a second division plate 188 is provided, spaced below division plate 20" to define a plenum 189 therebetween. The gas from opening 186 passes through a set of circumferentially spaced openings 190 in a circular plate 192 extending between division plates 20", 188. The gas then passes through rows of circumferentially spaced openings 194 and into the space above bed 14-3".

Since opening 186 extends above division plate 20" and below division plate 188, slots 196, 198 respectively have been cut in these plates, and transition plates 200, 202 have been welded in these slots as previously described.

The embodiments of the invention in which an exclusive property of privilege is claimed are defined as follows:

1. A converter having an exterior shell of a strong, heat resistant, weldable metal, a lowermost catalyst bed within said shell, and at least one further bed within said shell above said lowermost bed, a division plate of said metal between said beds, each bed including a support plate of said metal, each support plate and said division plate being preformed to a domed configuration to limit sagging of such plate in use, means for conducting sulphur dioxide containing gas into said lowermost bed, and means for conducting said gas from said lowermost bed to said further bed, said lowermost bed being the first catalyst bed in said converter, said division plate being spaced below said support plate of said further bed to define a space therebetween, said shell having an opening therein below said support plate of said further bed for flow of gas between said space and the exterior of said converter, the diameter of said opening being greater than the height of said space, said division plate having a slot therein, the periphery of said slot meeting the edges of said opening, and a transition plate extending between the periphery of said slot and the periphery of that part of said opening located below said transition plate.

2. A converter having an exterior shell, at least two catalyst beds within said shell, one above the other, each catalyst bed having a support plate for the catalyst thereof, a division plate between said beds, said support and division plates extending to and being sealingly secured to said shell, said division plate and said support plate of said one bed defining a space therebetween, said shell having an opening therein below said support plate of said one bed for flow of gas between said space and the exterior of said converter, the diameter of said opening being greater than the height of said space, said division plate having a slot therein, the periphery of said slot meeting the edges of said opening, and a transition plate extending between the periphery of said slot and the periphery of that part of said opening located below said transition plate.

3. A converter according to claim 2 wherein said shell, division plate, support plates and transition plate are all of stainless steel.

4. A converter according to claim 2 wherein the area of said slot is at least equal to the area of said part of said opening.

5. A converter having foundation means, an exterior shell of stainless steel extending upwardly from said foundation means and supported by said foundation means, an interior core tube of stainless steel extending vertically within said shell and being concentric therewith, said core tube extending from said foundation means and being supported by said foundation means independently of said shell, a plurality of annular catalyst beds within said shell and located one above the other, means supporting each of said beds both from said shell and from said core tube, means for conducting sulphur dioxide gas from a source of such gas into the lowermost bed so that said lowermost bed is the first catalyst bed, and means for conducting gas from said lowermost bed in succession through the remaining catalyst beds.

6. A converter having:
(a) an exterior shell,
(b) a plurality of vertically spaced catalyst beds within said shell, one of said catalyst beds being a first catalyst bed to receive sulphur dioxide containing gas from a source of said gas,
(c) means defining a plenum around said first bed,
(d) means defining with said plenum a space above said first bed,
(e) said plenum having a gas inlet opening therein for receiving said gas, and a circumferential outlet opening into said space, said outlet opening being located above said inlet opening and said plenum and said inlet and outlet openings being arranged for gas entering said inlet opening to change its direction sharply to pass through said plenum toward said outlet opening and then again to change direction sharply to pass through said outlet opening, whereby to tend to remove particulated entrained in the gas entering said inlet opening.

7. A converter according to claim 6 wherein said outlet opening comprises a series of circumferentially spaced holes in said plenum.

8. A converter according to claim 6 wherein said first bed is supported by said plenum from said shell, thereby reducing heat transfer from said first bed to said shell.

9. A converter according to claim 6 wherein said first bed is located adjacent the bottom of said shell and the other said beds are located above said first bed.

10. A converter according to claim 9 wherein said shell is formed of stainless steel.

11. A converter according to claim 9 and including a plurality of division plates one between each adjacent pair of said beds, and a plurality of support plates one supporting each of said beds, said division plates and support plates all being of stainless steel, said support plates and division plates being performed in a domed configuration to reduce sagging of said support plates and division plates in use.

12. A converter according to claim 11 wherein said domed configuration has substantially the form of a trough-shaped toroidal section.

13. A converter according to claim 9 wherein a second of said beds is located at the top of said converter, and a third said bed is located between said first and second beds, heat exchange means extending vertically within said shell along the axis of said shell and having an upper opening for receiving cooled sulphur dioxide containing gas, said heat exchange means including means for conducting hot gas from said first to said second bed and for cooling such gas by heat exchange with said cooled gas, said heat exchange means further including means for conducting said cooled gas, after it has been warmed by heat exchange with said hot gas, to said third bed.

14. A converter according to claim 13 and including a fourth catalyst bed located below said third bed, means for conducting gas from said third bed to said fourth bed, and cold air quench means for injecting cold air into the gas flowing from said third bed to said fourth bed.

15. A converter according to claim 13 wherein the division plate below said second bed is spaced below the support plate for said second bed to define a second space therebetween, said shell having an aperture therein below said support plate of said second bed for the flow of gas between said second space and the exterior of said converter, the diameter of said aperture being greater than the height of said second space, said division plate below said second bed having a slot therein, the periphery of said slot meeting the edges of said aperture, and a transition plate extending between the periphery of said slot and the periphery of that part of said aperture located below said transition plate.

16. A converter having:
(a) foundation means,
(b) a shell supported on said foundation means,
(c) an interior core tube extending vertically within said shell and being concentric therewith, said core tube being supported by said foundation means independently of said shell,
(d) a plurality of annular catalyst beds within said shell and located one below the other,
(e) a plurality of support plates one supporting each of said beds from said shell and from said core tube,
(f) axial heat exchange means within said core tube for conducting hot gas axially from one of said beds to a second of said beds,
(g) said heat exchange means including means for conducting cooled gas past said hot gas to cool said hot gas and to warm said cooled gas and for directing such warmed cool gas into a third one of said beds,
(h) a plurality of division plates one between each adjacent pair of said beds and separating said beds,
(i) said support plates and division plates being preformed in substantially the configuration of a trough-shaped toroidal section encircling said core tube, to reduce sagging of said support plates and division plates in use.

17. A converter according to claim 16 and including means for directing sulphur dioxide containing gas from a source of such gas to said one bed so that said one bed is the first of said catalyst beds.

18. A converter having:
(a) foundation means,
(b) a shell,
(c) an interior core tube extending vertically within said shell and being concentric therewith,
(d) a plurality of annular catalyst beds within said shell and located one below the other,
(e) means supporting said beds from said shell and from said core tube,
(f) axial heat exchange means within said core tube for conducting hot gas axially from one of said bed to a second of said beds,
(g) said heat exchange means including means for conducting cooled gas past said hot gas to cool said hot gas and to warm said cooled gas and for directing such warmed cool gas into a third one of said beds,
(h) means for directing sulphur dioxide containing gas from a source of such gas to said one bed so that said one bed is the first of said catalyst beds,
(i) said first bed being the lowermost of said beds and said second bed being at the top of said converter.

19. A converter according to claim 18 wherein said means supporting said beds includes a side plate in the form of an inverted truncated cone, said side plate having an upper edge secured to said shell and said first bed being supported from said side plate, said side plate shielding said shell from the hot catalyst in said first bed and from the hot gas from said first bed.

20. A converter according to claim 16, 17 or 18 wherein said shell and core tube are each of stainless steel.

21. A converter having foundation means, an exterior shell of stainless steel supported on said foundation means, an interior core tube of stainless steel extending vertically within said shell and being concentric therewith, said core tube being supported by said foundation means independently of said shell, a plurality of annular catalyst beds within said shell and located one above the other, a plurality of support plates one supporting each of said beds from said shell and from said core tube, a plurality of division plates one between each adjacent pair of said beds, said support plates and said division plates each being preformed in substantially the configuration of a trough-shaped toroidal section to reduce sagging of said support plates and division plates in use.

22. A converter according to calim 21 and including means for conducting sulphur dioxide gas from a source of such gas into the lowermost of said beds so that said lowermost bed is the first catalyst bed, and means for conducting gas from said lowermost bed in succession through the remaining catalyst beds.

23. A converter according to claim 21 or 22 wherein at least one of said division plates is spaced below an adjacent support plate to define a space therebetween, said shell having an opening therein below said adjacent support plate for flow of gas between said space and the exterior of said converter, the diameter of said opening being greater than the height of said space, said one division plate having a slot therein, the periphery of said slot meeting the edges of said opening, and a transition plate extending between the periphery of said slot and the periphery of that part of said opening located below said transition plate.

24. A converter having:
    (a) foundation means,
    (b) a shell supported on said foundation means,
    (c) an interior core tube extending vertically within said shell and being concentric therewith, said core tube being supported by said foundation means independently of said shell,
    (d) a plurality of annular catalyst beds within said shell and located one below the other,
    (e) a plurality of support plates one supporting each of said beds from said shell and from said core tube,
    (f) axial heat exchange means within said core tube for conducting hot gas axially from one of said beds to a second of said beds,
    (g) said heat exchange means including means for conducting cool gas past said hot gas to cool said hot gas and to warm said cool gas and for directing such warmed cool gas into said one of said beds,
    (h) a plurality of division plates one between each adjacent pair of said beds and separating said beds,
    (i) said support plates and division plates being preformed in substantially the configuration of a trough-shaped toroidal section encircling said core tube, to reduce sagging of said support plates and division plates in use.

25. A converter according to claim 24 wherein said one bed is the first of said catalyst beds and is the lowermost of said beds.

26. A converter having:
    (a) foundation means,
    (b) a shell,
    (c) an interior core tube extending vertically within said shell and being concentric therewith,
    (d) a plurality of annular catalyst beds within said shell and located one below the other,
    (e) means supporting said beds from said shell and from said core tube,
    (f) axial heat exchange means within said core tube for conducting hot gas axially from one of said beds to a second of said beds,
    (g) said heat exchange means including means for conducting cool gas past said hot gas to cool said hot gas and to warm said cool gas and for directing such warmed cool gas into said one of said beds,
    (h) means for directing sulphur dioxide containing gas from a source of such gas to said one bed so that said one bed is the first of said catalyst beds,
    (i) said first bed being the lowermost of said beds and said second bed being at the top of said converter.

* * * * *